United States Patent [19]
Frenck et al.

[11] 3,854,087
[45] Dec. 10, 1974

[54] KELVIN BRIDGE TYPE CORROSION MEASURING PROBE

[75] Inventors: John Parsons Frenck, Newark, Del.; Edward Gilpin Poole, Jr., Chesapeake City, Md.

[73] Assignee: E. I. du Pont de Nemours and Company, Wilmington, Del.

[22] Filed: Nov. 6, 1973

[21] Appl. No.: 413,366

[52] U.S. Cl. .................... 324/65 CR, 324/DIG. 1
[51] Int. Cl. ............................................. G01r 27/02
[58] Field of Search ......... 324/65 CR, 65 R, DIG. 1

[56] References Cited
UNITED STATES PATENTS

| | | |
|---|---|---|
| 2,947,679 | 8/1960 | Schaschl et al................ 324/65 CR |
| 3,153,217 | 10/1964 | Cramer et al. ................ 324/65 CR |
| 3,207,983 | 9/1965 | Schaschl et al................ 324/65 CR |

*Primary Examiner*—Stanley T. Krawczewicz
*Attorney, Agent, or Firm*—James A. Costello

[57] ABSTRACT

Disclosed herein is a Kelvin double bridge type corrosion measuring probe comprising inter alia an enclosing metal shell, at least a portion of which is specimen metal; a temperature-compensating body of specimen metal located inside the shell; a metal closure at the probe tip serving as the bridge yoke, and additional bridge resistances located usually within the probe and outside of the environment of the corrosive medium.

6 Claims, 3 Drawing Figures

KELVIN BRIDGE TYPE CORROSION MEASURING PROBE

BACKGROUND OF THE INVENTION

1. Field of the Invention

This invention concerns a corrosion measuring probe that operates on the principle that the electrical resistance of a metal specimen rises as the metal specimen corrodes. The metal specimen is part of an electrical circuit of the Kelvin double bridge type as is an internal temperature-compensating body of specimen metal.

2. Description of the Prior Art

It is well-known that the correlation between change in electrical resistance and change in cross-sectional area of a metal test specimen can be used to measure the corrosion rate of metals such as those used in constructing chemical processing equipment. However, in view of the very significant effect that temperature has on electrical resistance, precise measurements made with electrical bridges of the Wheatstone or Kelvin type are unreliable unless compensation is made for the variations in temperature than can occur in the corrosive medium.

In Wheatstone bridge arrangements an automatic temperature-resistance compensating bridge leg is normally formed from the same metal, preferably cut from the same piece of specimen metal stock, but made thicker in cross-section or coated to protect it from corrosion when directly exposed to the corrosive medium. However, a difference in thickness between the measurement element and the temperature compensating element or the inherent heat-insulating properties of coatings thick enough to protect the compensating element from corrosion tend to produce an error in corrosion measurement when the corrosive medium is subject to temperature fluctuations.

Typical disclosed Kelvin double bridge probes provide protected temperature compensating elements that are located essentially in-line with their specimen metal measurement elements but remote from the corrosive medium. Being in-line makes joining the measurement and temperature-compensating elements by an intervening yoke section simple electrically but produces an error in corrosion measurement because of the long thermal path through the yoke section between the elements. In such probes, even filling the yoke section with electrically insulative but thermally conductive potting compounds would be ineffective in bringing the two bridge elements into temperature equilibrium with each other and the corrosive medium in reasonably short response time.

SUMMARY OF THE INVENTION

This invention concerns a Kelvin double bridge type probe for measuring corrosion on specimen metal in a corrosive medium, the probe characterized in having, electrically interconnected, elements of i. an enclosing shell, at least part of which is the specimen metal element of the bridge, one end of the shell being conductively connected to the specimen metal and to ii. a reference body of specimen metal that is inside the shell and thereby protected from contact with the corrosive medium, the reference body being at least partially surrounded by the shell, in thermal proximity to the shell, and electrically insulated therefrom except for bridge connections, and iii. two pairs of bridge resistances having electrical contact with a source of electricity, and connecting the specimen metal to the reference body, each resistance of each pair being connected to the other of the pair at one end with the other end connected to the specimen metal or the reference specimen, each pair of resistances having a junction between each resistance of the pair, each junction linked to output leads that provide a bridge signal as a function of corrosion of the specimen metal.

Shell wall thickness can vary widely but is generally less than the wall thickness of the vessel in which the probe is mounted. Preferable shell wall thickness is from about 10 to 30 mils and is less than 10% of the shell width or diameter.

In a preferred embodiment of this invention, a pair of bridge resistances are electrically connected to the specimen metal element of the enclosing shell at positions of increased shell thickness. It is also preferred that the thermal proximity of the reference body to the enclosing shell be augmented by thermally conductive potting compound between the reference body and the enclosing shell.

Figure 1:
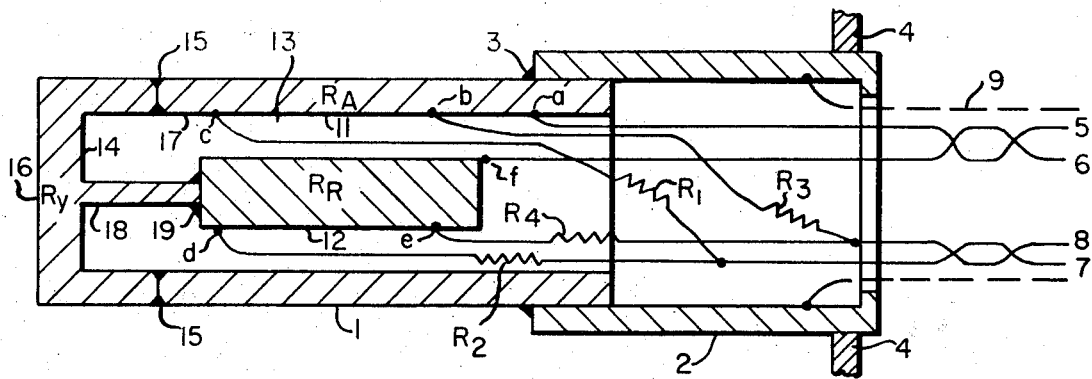
FIG. 1 is a construction and wiring diagram of a typical resistance probe assembly.
Figure 2:
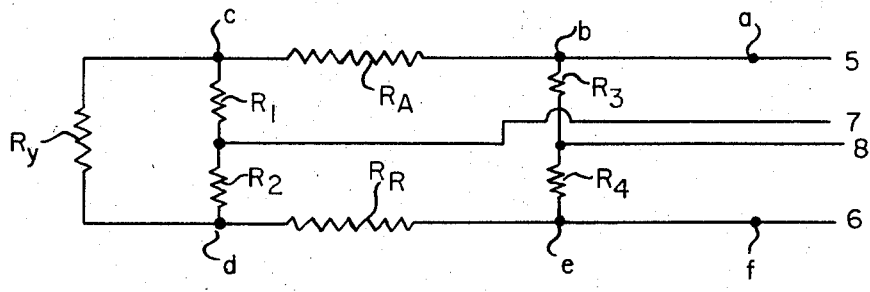
FIG. 2 is a schematic wiring diagram which is an electrical representation of the probe as a Kelvin double bridge circuit.

The resistance probe assembly of FIG. 1 and the schematic Kelvin double bridge circuit of FIG. 2 carry the same designations for resistance values and circuit connections.

DETAILS OF THE INVENTION

The Measuring Probe

The improved Kelvin double bridge type probe of this invention is useful in continuous in-line monitoring of corrosion, and especially in measuring and warning of any abnormal corrosion such as would be experienced by process upsets, wherein rapid thermal fluctuations are involved in normal operation. It is not restricted in its operating environment except by temperature limits imposed by its materials of construction. It is sensitive to both electrically conductive corrosion media and nonconductive media because it is generally is low resistance probe compared to Wheatstone bridge type probes, hence it does not short out due to conductive deposits or shorting paths through the corrosive medium itself.

The Enclosing Shell

Regarding shell construction generally, metallic, homogeneous tubular stock or hollowed rod or bar stock can be employed that has a relatively thin wall, e.g., 10–30 mils. In a preferred embodiment of this invention the hollow shell of specimen metal serving as the measurement element has a shell wall that is thin enough compared to shell diameter (less than 10% of shell diameter) to provide essentially linear variation of change in bridge output with decrease in shell wall thickness.

Suitable enclosing shells containing a specimen metal portion thereof which is the measurement element can have various geometrical shapes, irregular as well as regular, having cross-sections that vary along the probe length. Normally, cross-sections are uniform and include square, rectangular, elliptical and other common forms as well as the preferred tubular or cylindrical form.

The conductively connected end for the enclosing shell serves as a mechanically supportive yoke between the measurement and reference elements of the bridge and can have a variety of shapes. It can be a simple plane-surfaced cap or extend outward to form a probe tip, or be indented so long as the indentation is not such as to result in formation of a stagnant pool of corrosive liquid therein having relatively constant temperature. Such a liquid pool might exchange heat with the reference element by conduction through the yoke, thereby disturbing the desired thermal equilibrium between measurement and reference elements.

It has been found beneficial and is preferred to increase the thickness of the measurement element in the immediate vicinity of a spot-welded contact to reduce the effect or corrosion of the nearby outer surface of the hollow shell upon the well-known spreading resistance of a point contact.

By "terminal points" as employed herein is meant not only that small area of contact essentially equal to the diameter of an attached wire but also an enhanced surrounding spreading resistance area and the even longer areas of contact sometimes encountered using pressure contacts. Other ways of employing area or even volume electrodes to define current-path segments or legs of a Kelvin double bridge will be apparent to those skilled in the art.

The Reference Specimen Metal Body

The body of specimen metal that serves as the reference element of the bridge can have various shapes. However, it is generally of smaller dimensions than the shell so that it can be located thermally proximate to the inner surface of the shell but remain electrically insulated therefrom except for bridge connections. Preferably, its length should be about the same as that of the measurement element to permit efficient heat transfer from the inner surface of the measurement element to its outer surface.

The specimen metal can be in the form of a solid body, for example, a rod mounted or supported by suitable means to be concentric with a tubular outer measurement element. It can be a hollow body, for example, a tube mounted concentrically within a tube. Or, it can be a square shape, either solid or hollowed, within a square measurement element; or rectangular within a rectangular shell and so on. But it need not follow the shape of the hollow shell over its entire surface provided heat transfer is sufficient. Usually, at least 30% of its outer surface is in close proximity to the inner surface of the measurement element, and preferably, over half of its surface is located proximately thereto.

The Two Pairs of Bridge Resistances

It is not necessary for all bridge resistances to be located within the enclosing shell of the probe unit. For instance, in one embodiment two bridge resistances can be located within the probe with the remaining two bridge resistances located outside the probe head section and sleeve, usually with the measuring circuitry, as variable bridge-balancing resistors, but connected to the probe measurement element and the reference element by electrical leads.

Connection of bridge resistance pairs at potential terminal points and bridge input leads at current terminal points shown is accomplished by suitable joining processes for the specimen metal and the material of which the resistor leads or the bridge input pair in made. Such processes include spot-welding of common wire, soldering, brazing, and forming pressure contacts of metal-leaf brushes composed of wires shaped into a broom, metal gauze brushes, carbon brushes, and other high contact load configurations.

To overcome undesirable heat exchange and to generally improve the desired heat exchange and rapidity of thermal response to variations in the temperature of the corrosive medium, it is beneficial to fill the space between the two major bridge elements of concern with a thermally conductive but electrically insulative potting compound. Such space is normally about 10 to 100 mils wide and its area extends over at least 30% of the surface of the reference element, preferably over 50% and often over all of its surface. Usually very little volume of potting compound is required and it can be readily introduced under pressure to enter and fill the crevice between surfaces.

For corrosive medium temperatures below about 400°F., epoxy resins have been extensively used, sometimes with a limited amount of metallic silver or carbon filler to make them more thermally conductive without their being made electrically conductive. For temperatures above 500°F., ceramic-like materials such as Sauereisen cement have been used to fill the void space. Because such space is separated from the corrosive medium such epoxy resins and cements do not have to be chemically resistant to the corrosive medium, allowing a wider variety of materials to be used.

Potting compound used to augment thermal conductivity can also serve to affix electrical contacts to terminal points, or alternatively, to broaden terminal areas or regions of the measurement and reference bridge elements. Such potting compounds provide mechanical stability and preferably will be inert to the corrosive medium involved so as to avoid catastrophic failure of the probe should the measurement element be consumed.

The Probe and the Drawings

The probe shown in FIG. 1 is a typical tubular probe of two-piece welded construction comprised of a head section 1 of specimen metal joined to a sleeve section 2 by means of weld joints 3, said sleeve being of suitable material and diameter to be inserted through an opening in vessel wall 4. The head and sleeve combination forms the enclosing shell of the probe in this embodiment. Electrical leads are affixed to locations $a$, $b$, $c$, $d$, $e$, and $f$ on the inner surface of head section 1. Bridge power input leads attached at locations $a$ and $a$ are a twisted pair of wires 5 and 6.

Figure 3:
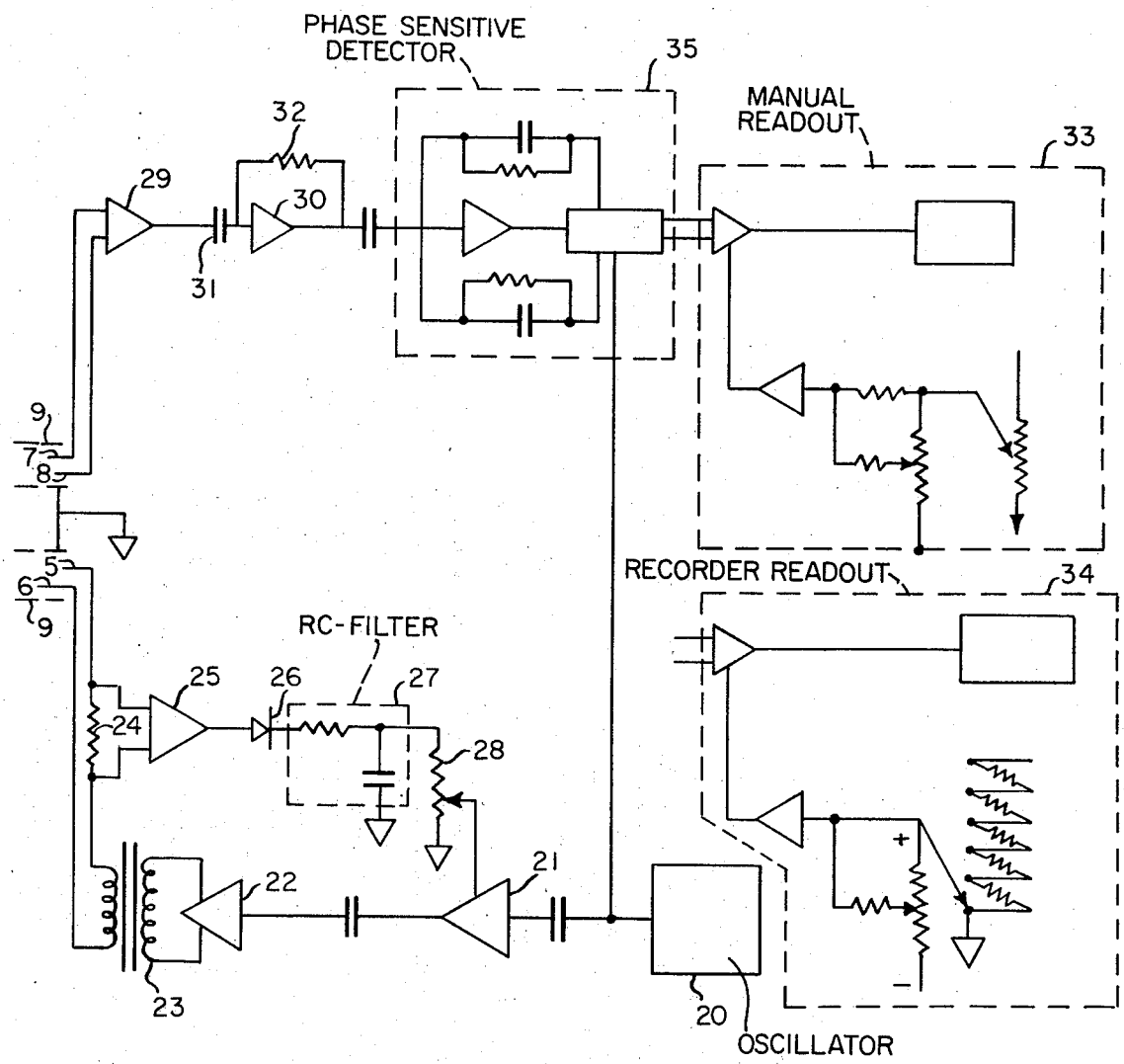
FIG. 3 is a wiring diagram illustrating probe connections to a suitable measuring circuit for determining the increase in electrical resistance of the corroding specimen metal as a result of its surface being exposed to a corrosive medium.

Electrical leads attached at locations $c$, $d$, $b$, and $e$ are connected through series resistors $R_1$, $R_2$, $R_3$, and $R_4$ respectively to a second twisted pair of wires 7 and 8 which serve as bridge output voltage leads. For continuous bridge balancing operation $R_3$ and $R_4$ are conveniently combined in a variable centertapped resistance pot usually located outside the shell (with the instrumentation shown in FIG. 3) because of its size. Both pairs of wires can be twisted to avoid inductive pickup of stray electrical crosstalk inside the probe itself and are protected from external electrical pickup by metallic shielding 9 affixed to the sleeve section 2 at location 10 and appropriately connected or electrically grounded at the measuring circuit as is shown in FIG. 3.

Within head section 1, $R_A$ represents the electrical resistance of bridge measurement element 11 consisting of tubular specimen metal between locations $b$ and $c$. $R_R$ represents the resistance of reference element 12 also formed of specimen metal, preferably from the same piece of metal stock, between locations $d$ and $e$. Reference element 12 is located proximately to the measuring element 11 but does not contact said element. Space 13 between the measurement element 11 and the reference element 12 is wide enough to electrically insulate one element from the other but is still narrow enough, i.e., normally from about 10 to 100 mils wide, to establish thermal equilibrium rapidly between the same two bridge elements by available heat transfer means, i.e., by heat radiation, heat conduction, or convection. Preferably (although not shown in the drawing) space 13 is filled with thermally conductive but electrically insulative material such as epoxy resins or ceramic-like materials having suitable fillers to impart such properties.

Yoke 14 joins bridge elements 11 and 12 electrically and also serves as a closure for the hollow probe. Yoke 14 is normally metallic and can be formed of specimen metal. Although various closure means can be used, a weldable yoke metal is preferred so that it can be attached as shown to tubular head section 1 by circular weld joint 15. As a characteristic Kelvin double bridge element, the yoke's electrical resistance $R_Y$ is recognized to include not only that portion of the yoke 14 having an outer surface 16, but also the resistance presented by tube wall 17 between weld joint 15 and location $c$, and the resistance presented by neck 18, weld joint 19, and specimen metal between weld joint 19 and location $d$.

FIG. 2 is an electrical representation of the Kelvin double bridge probe of FIG. 1. Bridge resistors $R_1$, $R_2$, $R_3$, and $R_4$ shown therein are usually made identical in resistance value so that the general formula for bridge balance becomes $R_A$ equal to $R_R$. The numbered bridge resistors must also be matched in temperature response like $R_A$ and $R_R$. They are usually made of identical materials and construction, and are located similarly by pairs within the tubular probe head or sleeve sections or with external instrumentation shown in FIG. 3 so as to be exposed to similar temperatures.

FIG. 3 illustrates the probe connections to externally located instrumentation which comprises a typical measuring circuit featuring a presettable constant current power source and either manual or recorder readout in units of corrosion quantity. This particular mode of operation is but one of several described in available literature and Kelvin double bridge patent art. The bridge power source shown in FIG. 3 consists of oscillator 20 for generating a square wave of a frequency different from 60 Hertz viz. 40 Hertz, connected to automatic gain control (AGC) amplifier 21 and thence to power amplifier 22. The output of the power amplifier 22 is coupled by means of load matching transformer 23 and current sampling resistor 24 to the bridge input twisted pair of wires 5 and 6 within grounded electrical shielding 9. Differential amplifier 25 is connected across resistor 24 at its input and at its output is connected in series with rectifier 26, resistor/capacitor (RC) filter section 27, voltage-adjusting potentiometer 28, and AGC amplifier 21.

Bridge output twisted pair of wires 7 and 8, also within grounded electrical shielding 9, are connected to the input of instrumentation amplifier 29 which has high input impedance, both common mode and differential, and a high common mode rejection ratio (CMRR). The output of amplifier 29 is connected to variable gain calibrating amplifier 30 which is coupled to amplifier 29 by capacitor 31 and has a calibrating feedback resistor 32 of suitable resistance value for zeroing any of various manual or recorder readout devices such as, for instance, 33 and 34 comprised of common amplifiers, variable resistors, and a comparison voltage source shown symbolically in suitable arrangements in FIG. 3. One such device is coupled at a time to amplifier 30 by phase sensitive detector means (PSD) 35, also connected to receive a reference voltage signal from square wave oscillator 20. Phase sensitive detector means 35 is selected from those described in the literature, e.g., in Journal of Physics E: Scientific Instruments 1970 Volume 3, pages 441–3, to be suitable for separating a desired signal from spurious signals and noise contained in the output of amplifier 30.

PROBE OPERATION

A probe is generally manufactured to have a specified design life expressed in mils thickness of corrodable specimen metal required to produce a nominal signal output of 10 volts or a bridge balancing voltage of 10 volts. For example, a probe with a design life of 10 mils (0.010 inches) will have a measurement element with a thickness greater than 10 mils. When the wall thickness of the measurement element is decreased by 10 mils, the resistance of the residual corroded specimen metal will increase, unbalancing the Kelvin double bridge sufficiently to produce a 10-volt signal output.

One advantage of using an enclosing shell of specimen metal having a relatively thin wall, according to a preferred form of this invention, is that the change in bridge output signal and the decrease in wall thickness vary linearly so that the output signal at any time is directly proportional to the design life spent up to that time.

In the typical measuring circuitry described above, the bridge current level and the calibrating feedback resistor 32 can be adjusted in value to properly establish the design life of a particular probe. Usually, a different calibrating resistor is supplied with each probe to provide the same signal level for all probes at the input to the phase sensitive detector 35, and the bridge current is maintained constant for all probes as follows. Current through resistor 24 is measured by differential amplifier 25 and observed. The output of amplifier 25 is passed through rectifier 26, RC filter section 27, and potentiometer 28 is appropriately adjusted to feed sufficient gain voltage to amplifier 21 to bring the bridge current to a desired value. The bridge current is then a constant current square wave centered about ground potential.

Probe installation in a vessel or piping containing a corrosive medium is accomplished by insertion through an appropriate vessel or pipe wall connector such as a Swagelok connector, so that the probe can be conveniently withdrawn and a replacement probe installed at a later time. A shielded electrical cable consisting of the two twisted pairs and necessary connectors matches the probe connector or plug at one end to the measuring circuitry at the other end. Application of 110 volt AC power energizes the measuring circuitry.

If corrosion occurs upon exposure to the medium, the thickness of the enclosing shell wall is correspondingly reduced. Resistance $R_4$ increases and produces a change in bridge output voltage between twisted pair leads 7 and 8 which is a true measure of the amount of corrosion or decrease in mils of design life. The output of phase sensitive detector 35 is differential DC with feedthrough spikes at the reference frequency. This frequency is not a multiple of 60 Hz and is conveniently chosen to be 40 Hz for nonmagnetic metals and for magnetic specimen metals. The amplitude of the differential DC output of PSD 35 is proportional to the bridge output or unbalance.

In alternative circuitry based on continuous bridge balancing, well-known to those familiar with Kelvin double bridge operation, other means may be devised to separate static, common-mode, cross-talk noise or extraneous signals from the true bridge signal, while continuously insuring accurate temperature compensation throughout the design life of the probe. In one embodiment bridge resistances $R_3$ and $R_4$ are variable resistors located outside the probe in a measuring circuit so composed as to automatically vary their resistances, keep the Kelvin bridge balanced, and provide a readout of the remaining life of the probe.

Two types of readout are available for bridge unbalance. The first is a manual type not utilizing a recorder in which a calibrated multi-turn potentiometer is connected to a nominal 10-volt DC source of potential and the combination used to null the bridge unbalance signal as transmitted by the phase sensitive detector. The second type of readout uses a chart recorder having appropriate sensitivity to display small incremental changes in bridge output voltage.

The following Example describes illustratively one typical method for making the probe of this invention. It also describes actual probe operation in an illustrative instance.

EXAMPLE

In forming a hollow specimen shell, carbon steel (SA515) barstock 4.75 inches long was given a 0.360-inch bore and turned down in a lathe to 20-mil wall thickness over a 2 ¾-inch specimen length, leaving 45-mil walls for about an inch on either side.

From a 4 ¼-inch length of adjacent barstock material a solid reference body insert for the above shell was turned down to 0.180-inch diameter over a length of 3 ¾-inches at one end. The remaining half-inch of length was reduced to a clearance diameter suitable for insertion into the specimen shell and welding it fast as a yoke.

Prior to welding, three electrical leads consisting of 20-mil diameter nickel plated copperweld wire were fusion welded as shown in FIG. 1 to the hollow specimen shell, leads $a$, $b$, and $c$ being affixed to the inner surface of the 45-mil thick wall adjacent to the specimen element. Three additional electrical leads made of the same wire were fusion welded as shown in FIG. 1 to the reference body. All six leads were then electrically insulated with 58-mil O.D. alumina tubing. The insulated wires were drawn into the 90-mil space between the specimen metal element and the reference body as the reference body was inserted inside the hollow shell and welded concentrically in place at the probe tip.

Two 10.0 ohm bridge resistors $R_1$ and $R_2$ were attached to the appropriate electrical leads as shown in FIG. 1. Their other ends were joined at a junction with another electrical lead 7 of Teflon TFE-fluorocarbon insulated No. 22GA wire for connection to external electronic instrumentation. Resistors $R_1$ and $R_2$ were located within a sleeve section 2 welded to the head section 1 as shown in FIG. 1. In order to operate in a balanced bridge mode, remaining bridge resistors $R_3$ and $R_4$ comprising a 5,000 ohm pot with a motor driven centerarm were located outside the probe with the instrumentation essentially as shown in FIG. 3.

Void space in the head section and the sleeve section was then filled with Emerson & Cuming, Inc., Stylcast No. 2850 and epoxy-cured with No. 11 catalyst. This potting compound had a service temperature of 400°F. A round AN 6 prong shielded threaded connector was attached by epoxy cement to the sleeve and used to bring bridge leads through a vessel wall to external instrumentation as shown in FIGS. 1 and 3.

The oscillator 20 in FIG. 3 provided a 40 Hz sinusoidal bridge input signal which was amplified and adjusted to provide about 0.2 to 0.4 amperes bridge current and several millivolts drop across the bridge specimen element. Calibration curves run with the probe in a corrosive medium showed essentially linear variation in bridge output with decreasing specimen element thickness.

Two such probes were mounted at the top and halfway up a 130-ft. high distillation column made of low carbon, SA516 type boiler grade steel. At start-up, corrosive HCl vapor suspected of trace moisture was heated to process temperatures as high as 320°F with the probe showing essentially no temperature fluctuations. During one month service the middle probe indicated gradual, complete loss of its original 20-mil thickness while the top probe still had residual design life. After shutdown of the process the probes were withdrawn and examined in comparison with steel test coupons mounted side-by-side at the two vessel locations. The specimen element of the middle probe was missing and the underlying epoxy was charred and cracked. The corresponding coupon indicated over 20-mils corrosion. The remaining design life of the upper probe indicated electrically by variation of bridge output during its month of service was in agreement with thickness measurements of both the specimen element of the probe and its coupon.

The embodiments of the invention in which an exclusive property or privilege is claimed are defined as follows:

1. A Kelvin double bridge type probe for measuring corrosion on specimen metal in a corrosive medium, the probe characterized in having, electrically interconnected, elements of i. an enclosing shell, at least part of which is the specimen metal element of the bridge, one end of the shell being conductively connected to the specimen metal and to ii. a reference body of specimen metal that is inside the shell and thereby protected from contact with the corrosive medium, the reference body being at least partially surrounded by the shell, in thermal proximity to the shell, and electrically insulated therefrom except for bridge connections, and iii. two pairs of bridge resistances having electrical contact with a source of electricity, and connecting the specimen metal to the reference body, each resistance of each pair being connected to the other of the pair at one end with the other end connected to the specimen metal or the reference specimen, each pair of resistances having a junction between each resistance of the pair, each junction linked to output leads that provide a bridge signal as a function of corrosion of the specimen metal.

2. A probe according to claim 1 wherein the thickness of the enclosing shell is from about 10 to 30 mils.

3. A probe according to claim 2 wherein the thickness of the enclosing shell is less than 10% of the shell diameter.

4. A probe according to claim 1 wherein a pair of bridge resistances are electrically connected to the specimen metal element of the enclosing shell at positions of increased shell thickness.

5. A probe according to claim 1 containing thermally conductive potting compound between the reference body and the enclosing shell.

6. A probe according to claim 1 wherein at least 30% of the reference body is surrounded by the specimen metal element of the enclosing shell.

* * * * *